No. 674,867. Patented May 28, 1901.
P. C. HOWE.
CIRCUIT OPERATING DEVICE.
(Application filed Mar. 12, 1900.)

(No Model.)

Witnesses:
Arthur T. Randall.
Louis B. Snow.

Inventor:
Percy C. Howe.

UNITED STATES PATENT OFFICE.

PERCY C. HOWE, OF BOSTON, MASSACHUSETTS.

CIRCUIT-OPERATING DEVICE.

SPECIFICATION forming part of Letters Patent No. 674,867, dated May 28, 1901.

Application filed March 12, 1900. Serial No. 8,281. (No model.)

*To all whom it may concern:*

Be it known that I, PERCY C. HOWE, of Boston, in the county of Suffolk and State of Massachusetts, have invented an Improved Circuit-Operating Device, of which the following is a description, reference being had to the accompanying drawings, in which—

Figure 1:
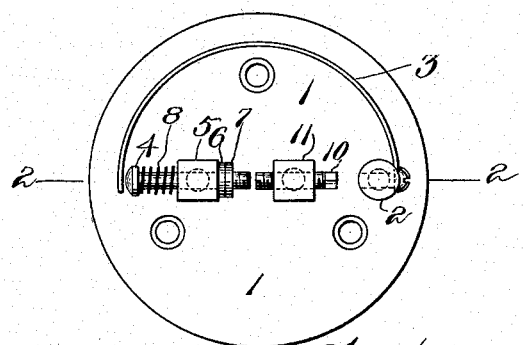
Figure 2:
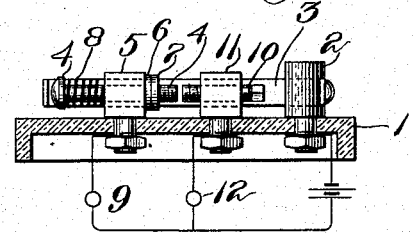
Figure 3:
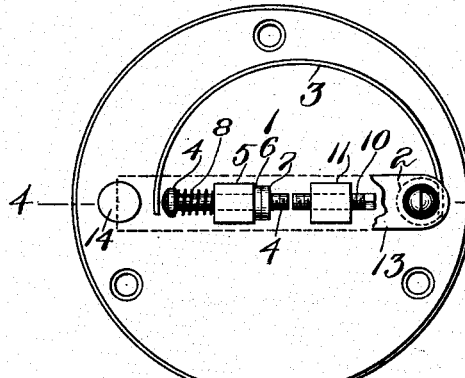
Figure 4:
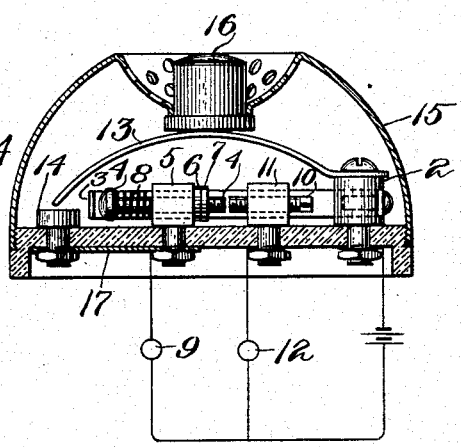

Figure 1 is a plan view of a device embodying one form of my improved circuit-operating device. Fig. 2 is a section on line 2 2 of Fig. 1. Fig. 3 is a plan view of another form of my invention wherein the device shown in Figs. 1 and 2 is combined with other features. Fig. 4 is a section on line 4 4 of Fig. 3.

My improved circuit-operating device comprises a base, a thermostat fastened to said base, two circuit-terminals on said base adapted to be connected by said thermostat, one of which is movable and adapted to be actuated by movement of the thermostat, and a third terminal with which said movable terminal contacts when the latter is actuated by said thermostat so constructed and arranged that a change in temperature causes the thermostat to first connect two of the terminals, and thereby operate one circuit, and so that a continued change in temperature in the same direction causes the thermostat to next move the movable terminal, and thereby operate a second circuit.

In its best form my invention also comprises a movable contact member which is adapted to be operated manually independently of the thermostat to thereby connect two of the terminals and operate a circuit.

In the drawings the base 1 has fastened to it a terminal 2, to which is fastened one end of a thermostat 3, and the free end of thermostat 3 is arranged next to one end of a movable terminal 4, which is mounted in a post 5, fast to base 1. The opposite end of terminal 4 is threaded to receive on it a nut 6 and a check-nut 7, by means of which said terminal may be adjusted relatively to the free end of thermostat 3, and a spring 8 holds terminal 4 in its normal position with nut 6 bearing against post 5.

A change in temperature causes the free end of thermostat 3 to move toward and contact with terminal 4, and thereby close a circuit in which a signal 9 is located. A continued change in temperature in the same direction causes the thermostat to move terminal 4 against the force of spring 8 and into contact with a terminal 10, which is herein shown as a screw mounted in a threaded socket in a post 11, fast to base 1 and adjustable to and from terminal 4. When terminal 4 is moved by the thermostat into contact with terminal 10, a second circuit through a signal 12 is closed.

In the best form of my invention terminal 2 also has connected to it one end of a movable contact member 13, the free end of which is arranged above a terminal 14, fast to base 1, and to base 1 is also fast a cap 15, in which is mounted a push-piece 16, which engages said contact member 13, so that said member 13 may be operated manually independently of the thermostat 3 to thereby close the circuit through signal 9, so that that signal may be operated manually or automatically by thermostat 3.

My device in its best form is useful in hotels and other places for "call" service and also as an automatic fire-alarm, in which case signal 9 may be located in the office of the building and signal 12 at the engine-house or any other desired point, so that when the device operates automatically a preliminary signal is first given to the occupants of the building and afterward at the engine-house if the fire is not immediately extinguished.

It is obviously within the scope of my invention to use my device to open normally closed circuits as well as to close normally open circuits, as shown and described.

In the drawings I have shown post 14 as a separate post and as electrically connected with post 5 by a strip 17, although it is obvious that post 14 may be integral with post 5—that is to say, post 14 may, if desired, be dispensed with and the movable contact member arranged to contact with post 5 directly.

What I claim as my invention is—

A circuit-operating device comprising a base; the terminal 2 fastened to said base; the curved thermostatic strip 3 fastened at one end to said terminal 2 and free at the other end; the independently-adjustable terminal 10 mounted on said base; the spring-pressed and movable terminal 4 mounted on said base and interposed between the free end of said thermostatic strip and said terminal 10; the movable contact member 13 fastened at one end to said terminal 2 and adapted to be operated manually independently of said thermostatic strip to connect two of the terminals, all combined substantially as described.

PERCY C. HOWE.

Witnesses:
A. L. HOWE,
C. W. SNOW.